United States Patent [19]
Waters

[11] 4,033,278
[45] July 5, 1977

[54] APPARATUS FOR CONTROLLING LATERAL POSITIONING OF A MARINE SEISMIC CABLE

[75] Inventor: Kenneth H. Waters, Ponca City, Okla.

[73] Assignee: Continental Oil Company, Ponca City, Okla.

[22] Filed: Feb. 25, 1976

[21] Appl. No.: 661,065

[52] U.S. Cl. .............................. 114/245; 114/281; 340/3 T; 340/7 PC
[51] Int. Cl.² ................. B63B 21/56; B63B 17/00
[58] Field of Search ......... 114/66.5 H, 121, 235 B, 114/236; 244/44, 123; 340/3 T, 7 PC

[56] References Cited
UNITED STATES PATENTS

| | | | |
|---|---|---|---|
| 3,375,800 | 4/1968 | Cole et al. | 114/235 B |
| 3,434,446 | 3/1969 | Cole | 114/235 B |
| 3,611,975 | 10/1971 | Ashbrook | 114/235 B |
| 3,753,415 | 8/1973 | Burtis | 114/126 |

*Primary Examiner* — Stephen G. Kunin
*Attorney, Agent, or Firm* — William J. Miller

[57] ABSTRACT

Apparatus for controlling the lateral position of a marine seismic cable relative to water current which is effective through utilization of one or more cable paravanes having a thrust adjustable hydrofoil and/or stabilizer elements. The hydrofoil is constructed as a pivotally supportable frame having an elastomeric skin which is supported on the sides of the hydrofoil by movable support members, and a servo-controlled reversible motor is controlled to reciprocate the opposite side support members relative to the hydrofoil longitudinal center line. One or more hydrofoils may then be controlled as to angle of attack and camber from the towing ship by means of acoustic energy transmission and reception at the paravane.

5 Claims, 9 Drawing Figures

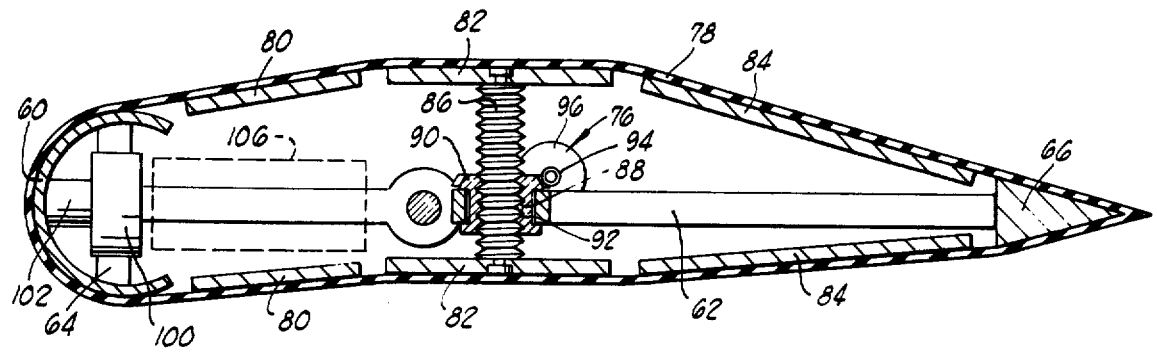
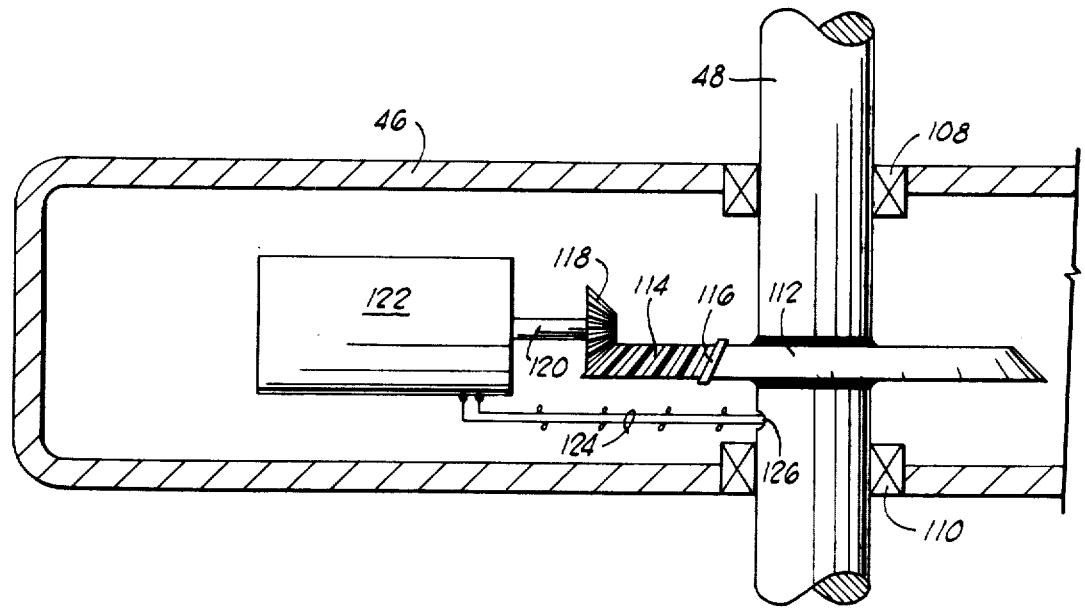

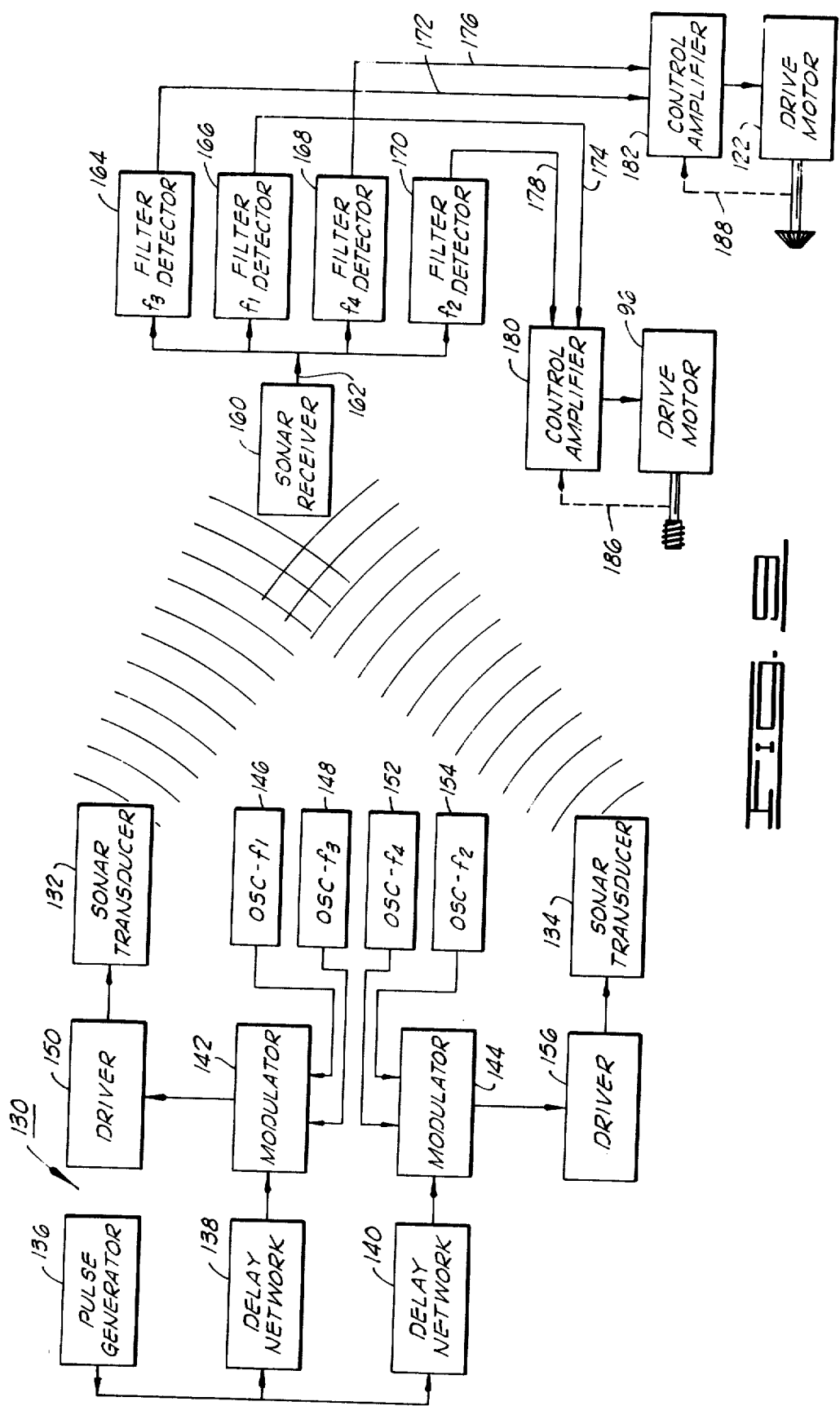

APPARATUS FOR CONTROLLING LATERAL POSITIONING OF A MARINE SEISMIC CABLE

BACKGROUND OF THE INVENTION

1. Field of the Invention

The invention relates generally to marine seismic cable control practice and, more particularly, but not by way of limitation, it relates to improved paravane and hydrofoil apparatus which is remotely controllable as to lateral thrust.

2. Description of the Prior Art

The prior art now includes numerous types of seismic cable paravanes which are utilized for controlling cable depth and such paravanes are particularly characterized by the teachings of U.S. Pat. Nos. 3,434,446; 3,531,761 and 3,531,762. Still other depth-controlling paravanes are existent in the prior art and in large part these teachings depend upon particular guidance and control structure for their novelty. Lateral cable guidance by paravanes in the old and well-known mine sweeping tradition is also utilized in seismic practice and this method is particularly shown in U.S. Pat. No. 3,581,273. Actual guidance both vertically and horizontally is taught in U.S. Pat. No. 3,605,674 wherein remotely controllable D-C motors are utilized to rotate guidance vanes to control paravane and cable attitude both laterally and vertically.

SUMMARY OF THE INVENTION

The present invention contemplates a marine seismic cable control system wherein signals transmitted from the towing ship are received and utilized at one or more cable-controlling paravanes to effect variation of the attack angle and lift thrust of the paravane hydrofoils thereby to vary and control lateral positioning of the towed cable. The hydrofoils are constructed for pivotal support and are controllably pivotable and deformable in their transverse dimension so that the arcuate side surfaces can be reciprocally varied to alter the camber and lift thrust.

Therefore, it is an object of the present invention to provide an improved method for lateral positioning of a seismic cable under tow.

It is also an object of the invention to provide a paravane apparatus having remotely controlled hydrofoil elements with variable angle of attack and lift thrust to effect lateral positioning.

Finally, it is an object of the present invention to provide a remotely controllable hydrofoil element which is readily variable as to its horizontal cross-sectional configuration thereby to vary the lift thrust force exertion upon movement through water.

Other objects and advantages of the invention will be evident from the following detailed description when read in conjunction with the accompanying drawings which illustrate the invention.

BRIEF DESCRIPTION OF THE DRAWINGS

FIG. 7 is a cross-sectional view through a hydrofoil constructed in accordance with the present invention;

FIG. 8 is a partial section of the paravane frame of FIG. 4 showing a hydrofoil rotating control assembly; and FIG. 9 is a block diagram of one form of remote control circuitry which may be utilized in the present invention.

DETAILED DESCRIPTION OF THE INVENTION

Figure 1:
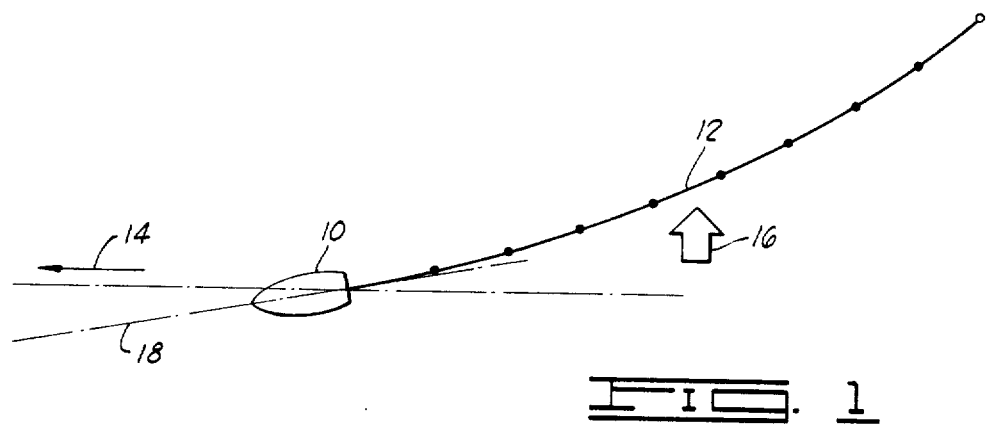
FIG. 1 is a schematic representation of a seismic cable under tow and the effects of lateral current.

FIG. 1 illustrates the problem encountered with towing a marine seismic cable in cross currents of any magnitude. Thus, a tow vessel 10 towing streamer or cable 12 along the designated course 14 is very much hampered by a cross current 16. The cross current 16 tends to carry cable 12 to a considerable starboard quarter angle and, in turn, causes tow vessel 10 to crab to a bow angle oriented along line 18. Vessel 10, in attempting to proceed along designated course 14, must proceed with increased resistance under rudder strain, and it is difficult to chart received seismic data which must be correlated and recorded with respect to designated course line 14.

Figure 2:
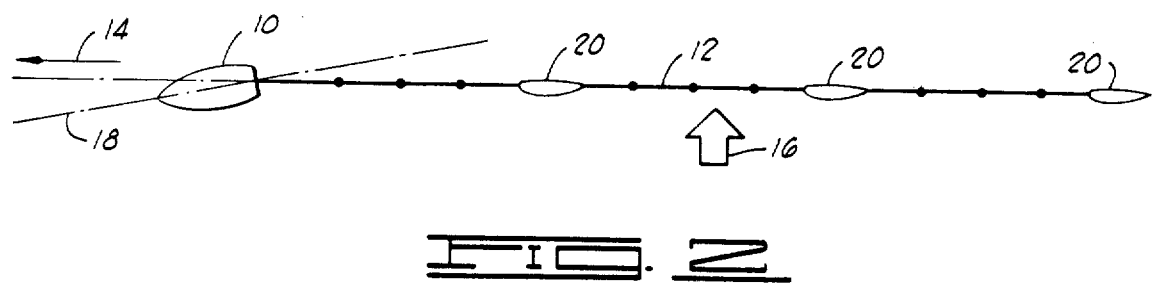
FIG. 2 illustrates the present invention while effecting desirable correction to the two attitude of the seismic cable.

FIG. 2 then illustrates the manner in which a plurality of paravanes 20, as constructed in accordance with the present invention, function to maintain cable 12 in proper alignment along the survey line or designated course 14 despite the cross current 16. As depicted, each of the paravanes 20 are illustrated as a single hydrofoil having greater camber placed on the port surface thereby to exert portside thrust and to maintain cable 12 linearly along the designated course 14. As will be further discussed below, the amount and direction of camber of the hydrofoil elements of each paravane are remotely controllable such that amount and direction of sideward thrust may be continually controlled from aboard the tow vessel 10.

Figure 3:
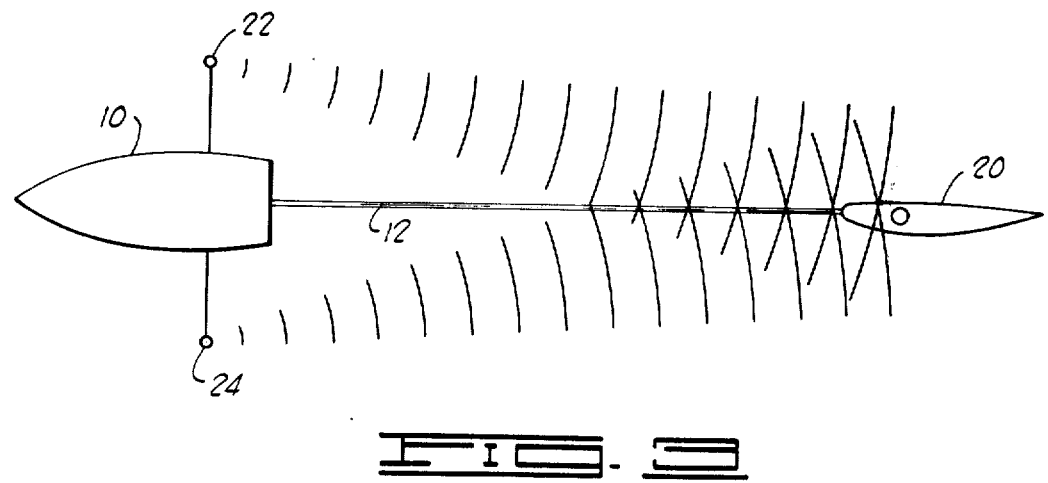
FIG. 3 is a schematic showing of one form of control method of the present invention.

FIG. 3 illustrates in schematic form one scheme wherein paravane 20 may be controlled from the two vessel 10. This is simply a scheme whereby two shipboard energy transmitters 22 and 24 are controlled to transmit energy patterns having the requisite control modulations but which energy enjoys diversity and dependence through frequency differentiation, pulse modulation techniques, timed firing, or such other modes as are generally recognized as providing multiple operation transmission differentiation. It is presently proposed that sonar energy transmission of two different frequencies be utilized with dual frequency magnetostrictive or piezoelectric reception at the paravane 20. The dual frequency transmissions are alternately emitted to enable parallactic control, and the transmission frequencies $f_1$ and $f_2$ should be selected in approximate frequency range and frequency difference such that there will be no harmonic interference as between frequencies $f_1$ and $f_2$, and little or no effect relative to the hydrophone reception of desirable seismic energy reflection signals. Thus, selected frequencies in the range between 25 and 30 kilocycles will provide good paravane control transmission.

Figure 4:
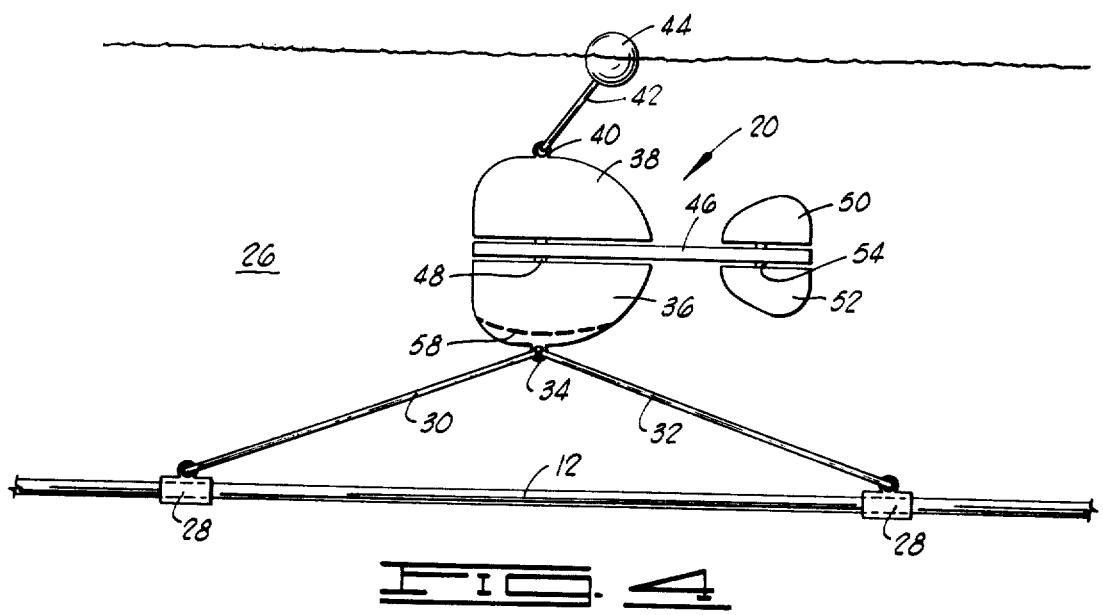
FIG. 4 is an elevational showing of a paravane constructed in accordance with the present invention.

FIG. 4 illustrates a paravane 20 in greater detail as it is shown supporting cable 12 within a body of water 26. Paravane 20 is attached to cable 12 by means of a pair of spaced cable clamps 28 which are securely affixed in osition on cable 12 and detached to elastomeric support cables 30 and 32 which attach to a securing eye 34 integrally formed with lower hydrofoil 36 of paravane 20. An upper hydrofoil 38 also includes an integrally formed securing eye 40 for attachment to a lead line 42 which, in turn, is secured to a float indicator 44 at the surface of the body of water 26. The float indicator 44 constitutes a surface buoy which functions not only to suspend cable 12 from the surface of water 26 but also to provide visual indication of the cable position for shipboard observance. Adjustment of the length of lead line 42 in accordance with proposed ship speed will then provide control of the depth of cable 12 during sounding operations.

The paravane 20 is comprised of a central body or frame member 46 which may be planar in character while providing interior space for storage and disposition of electronic circuitry and other auxiliary devices as will be further described. The remainder of the interior is filled with non-conductive fluid medium which is adjusted in well-known manner to achieve requisite buoyancy characteristics. The upper and lower hydrofoils 38 and 36 are each attached to a shaft 48 which is rotatably supported through the center of frame 46 at its forward end, as will be further described below. The shaft 48 is constructed to have a central bore through which wiring can be run as between hydrofoils 36 and 38 and frame 46. Upper and lower stabilizers 50 and 52 are supported on a shaft 54 which may be secured in fixed position through the center of frame 46 at its trailing end.

Figure 5:
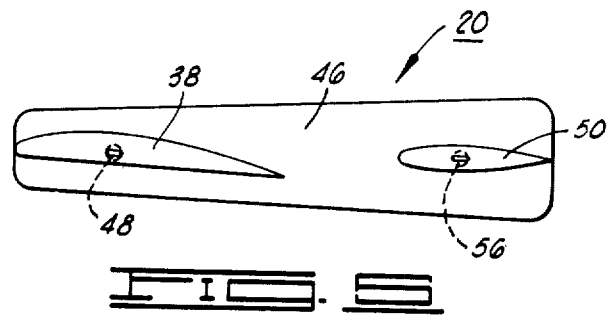
FIG. 5 is a top plan view of the paravane illusrated in FIG. 4.

FIG. 5 illustrates the paravane 20 in top view with hydrofoil 38 shown in the position of starboard camber, as will be further described. Referring again to FIG. 4, weight such as predetermined amounts of lead ballasting may be added in lower hydrofoil 36 in the area generally shown by dash line 56 and, in like manner as frame 46, the interior of all stabilizer and hydrofoil elements are filled with a non-conducting fluid to allow control over buoyancy of paravane 20. Such practice also serves to reduce overall impedance contrast of paravane 20 such that scattering of reflected seismic waves from "bladder effect" is minimized.

Figure 6:
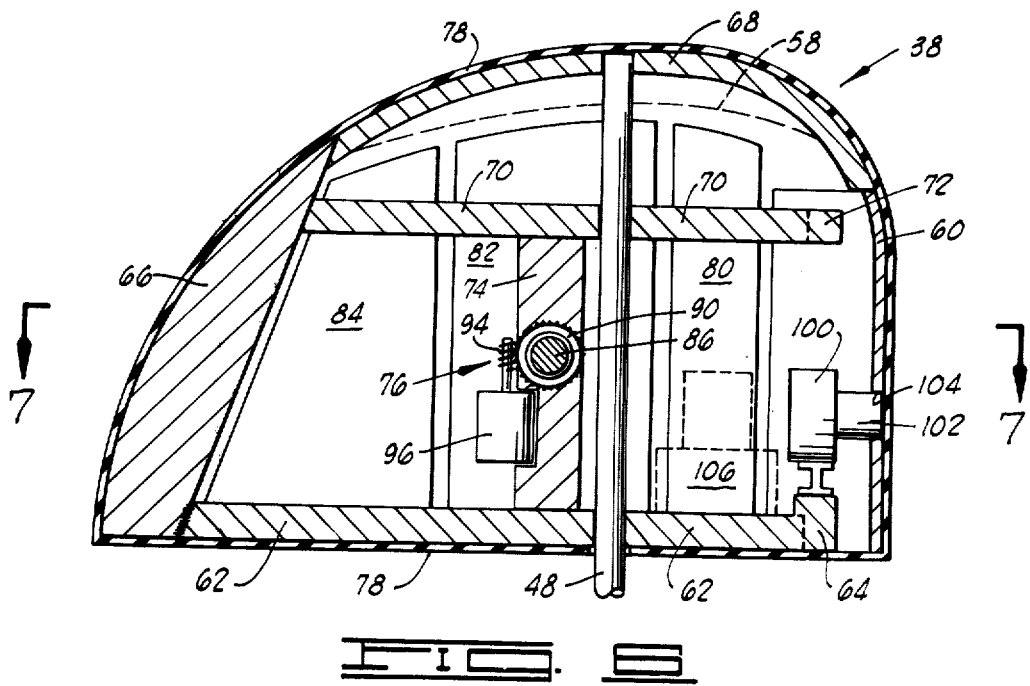
FIG. 6 is a vertical cross-section through a hydrofoil constructed in accordance with the present invention.

Referring now to FIG. 6, a hydrofoil element, in this case upper hydrofoil 38, is constructed in a manner which allows transverse deformability of the side surfaces such that adjustable camber is effected thereby to vary the transverse thrust of the hydrofoil upon movement through water. The basic frame of hydrofoil 38 consists of the leading edge circle as formed by an arcuate forward frame tube 60, see also FIG. 7 which illustrates the approximate degree of arc. A longitudinal frame 62 having a T-head 64 is secured to the forward frame 60 by affixure of the T-head 64 within the inner arcuate surface of forward frame 60. The opposite end of frame member 62 is then secured by welding or bonding, depending upon structural materials, to the trailing edge frame 66, a generally triangular block form having the trailing or outer edge conformed for least water resistance. A generally arcuate frame rib 68 is then rigidly secured between the upper leading portion of forward frame 60 and the upper leading portion of trailing edge frame 66 to complete the structural unit. As shown in FIG. 6, forward frame 60, rib frame 68 and trailing edge frame 66, as formed constitute a streamlined outline offering optimum hydrofoil advantages.

Yet another T-bar or upper frame 70 having T-head 72 is utilized to provide structural rigidity. Thus, T-head 72 is also rigidly secured within the inner circumfery of forward frame 60 while the trailing end of upper frame 70 is secured as by welding or bonding to the upper extremities of trailing edge frames 66. An intermediate support bar 74 is vertically disposed and securely affixed between the upper surface of frame 62 and the lowr surface of upper frame 70, and support bar 74 retains a thrust assembly 76 therein, such thrust assembly 76 to be further described in detail.

The entire outer skin of hydrofoil 38 consists of an elastomeric material covering 78, e.g. rubber, which serves both to seal the hydrofoil unit and to enable deformable changes in transverse cross-section. The side surfaces of the resilient covering 78 are strengthened by a series of vertically aligned stiffeners or plates as bonded or otherwise affixed to the inner surface of covering 78. Thus, forward plates 80, middle plates 82 and rear plates 84 are bonded to the inner surface of covering 78 on each side, each plate being shaped for optimum hydrofoil configuration, and the stiffening plates maintain the transverse cross-section of the hydrofoil in a predetermined shape as controlled by the screw jack assembly 76.

Screw jack assembly 76 consists of a thrust screw 86 which is securely retained by a suitable captive fixture, welding or the like between the opposing midplates 82, while extending through a drive nut 88 having a drive gear 90 integrally formed around one edge thereof. The drive nut 88 is then rotatably secured through support bar 74 by means of a suitable form of bearing member 92. The gear 90 is then engaged by a worm gear 92 which transmits output rotation from a motor 94 to rotate drive nut 88 thereby to vary relative positioning of side plates 82 with respect to support bar 74. The motor 96 is preferably one of the well-known commercially available D-C reversible electric motors having selected size and power rating.

A sonar receiver 100 may be mounted on the T-head 64 of frame 62 in suitable manner to extend a transducer 102 for rigid affixure through a front bore 104 in forward frame 60 so that the forward surface of transducer 102 is energy coupled through covering 78 to surrounding water. Spaces shown as dash lines 106 may be utilized for placement of electronic circuitry and the D-C power source, e.g. a conventional form of battery having the requisite power rating. Associated wire interconnection as between hydrofoils 36 and 38 and/or main frame 46 may be run through a central bore formed within shaft 48, and the entire interior of the hydrofoil is then filled with a non-conductive fluid for purposes of buoyancy regulation; except, in the case of the lower hydrofoil 36, a selected amount of ballasting weight such as lead will be formed along the rib frame 68 within the confines of dash-line 58. (See FIG. 4). The control circuitry as contained in upper hydrofoil 38 may also be utilized to effect attack angle and camber control of lower hydrofoil 36.

The above-recited hydrofoil structure includes motor 96 for enabling energization of screw jack assembly 76 to vary the camber and direction of camber of the hydrofoil; however, it is also contemplated that controlled movement of shaft 48 be exercised in order to alter the angle of attack of hydrofoils 36 and 38 thereby to enable still more rapid change of position of paravane 20. As shown in FIG. 8, the drive assembly installed within the forward end of main frame 46 may be utilized to apply controlled rotation to hydrofoil shaft 48. The shaft 48 is rotationally disposed through main frame 46 as supported by suitable bearing members 108 and 110. A beveled gear 112 is then affixed as by welding or the like to the central portion of shaft 48, and only a sector 114 need be toothed between opposed stops 116 for engagement with a bevel drive gear 118. Bevel drive gear 118 is then powered by a shaft 120 and a D-C reversible electric motor 122 as energized by leads 124 which lead to a power source, e.g. a D-C battery in space 106 of hydrofoil 38. A small bore 126 will allow entry of conductors 124 to be led through the inner bore of shaft 48 and to the interior of hydrofoils 36 and 38.

FIG. 9 illustrates a basic form of electronic control system which may be utilized in the present invention. For example, the system may utilize one or more sonar frequency transducers aboard the two vessel; and with reception of one or more differentiated frequency acoustic energy signals at the paravane for subsequent control of hydrofoil rotation and/or hydrofoil camber control. Various forms of such control systems have been utilized in the past for remote control of paravanes and such control circuitry alone constitutes no part of the present invention. For example, U.S. Pat. No. 3,412,704 in the name of Buller, et al discloses one form of frequency responsive transmission system for maintaining a cable depth controller. Also, U.S. Pat. No. 3,434,446 in the name of Cole discloses yet another form of frequency responsive transmission system for effecting predetermined paravane control.

A transmitting system 130 consists of a pair of sonar transducers 132 and 134 as energized in conventional manner and operated in tandem from each side of the two vessel 10. The pulse generator 136 provides basic repetition rate control, as further controlled by delay networks 138 and 140 for input to respective modulators 142 and 144. Modulator 142 also receives master oscillator input at two selected frequencies, e.g. frequencies $f_1$ and $f_3$ from oscillators 146 and 148 whereupon output from modulator 142 is supplied to a driver 150 which energizes the sonar transducer 132. In a like manner, the oscillators 152 and 154 provide frequencies $f_2$ and $f_4$ as input to modulator 144 which, in turn, energizes driver 156 and sonar transducer 134. The sonar transducers 132 and 134 may be any of the conventional types, i.e., magnetostrictive, piezoelectric or the like.

Acoustic energy transmitted from transducers 132 and 134 is then detected by counterpart, frequency selective magnetostrictive or piezoelectric elements at a sonar receiver 160 whereupon received energy is amplified in conventional manner. Output 162 is then applied to a bank of filter-detectors which are characteristically designed to filter their designated frequencies of electrical energy with subsequent detection for output via respective lines 172, 174, 176 and 178. The output on leads 174 and 178 are then applied in known manner to a control amplifier 180 which energizes the camber control drive motor 96 in accordance with signal input. Detected output on leads 172 and 176 is similarly applied to a control amplifier 182 in order to effect control of the hydrofoil rotation drive motor 122. Similar control circuits, motors and transducer response elements may be included on any number of paravanes that are in operation.

The control amplifiers 180 and 182 may constitute any of well-known servo control circuits operating in conjunction with the respective drive motors 96 and 122 in response to control input and position reference as supplied by links 186 and 188, respectively.

It is preferable that control amplifier circuits 180 and 182 include pulse time discrimination circuitry whereby control of drive motor 96 is effected in accordance with received pulse time differential to maintain automatically the trailing position of cable 12 as pre-designated. That is, if ship board delay networks 138 and 140 are set equal, with no time delay between pulse outputs of sonar transducers 132 and 134, the paravane receiver circuitry will respond by servo controlling the paravanes to maintain the pre-set aft positioning. Likewise, if delay is interposed utilizing delay networks 138 and 140 and cable 12 may be controlled to maintain a laterally offset trailing position as might be utilized with a multicable array trailing from a single vessel. The shipboard control of the paravane 20 would primarily consist of coarse and fine control through respective hydrofoil rotation drive motor 122 and camber control drive motor 96.

It is also contemplated to utilize a transponder type of control circuit aboard the paravane whereby determinative acoustic signals are either reflected or retransmitted from the paravane back to the two vessel 10 thereby to enable further control and indication. That is, such returned signal energy can be processed and utilized aboard the two vessel 10 to provide signal input to an analog or digital computer which will enable calculation and display of the paravane position relative to the ship's path. Yet further calculations may be enabled, e.g., true geographic position of the paravanes can be made if additional inputs from the shipboard electronic positioning system and attendant servo compass equipment are provided.

The foregoing discloses a novel marine seismic cable control paravane having unique capabilities of automatic lateral positioning control. Such control is enabled through utilization of two degrees of variation of the vertical hydrofoil elements. That is, the vertical hydrofoils may be controlled as to angular rotation for course control of the paravanes, as operated in tandem if plural paravanes are utilized, and yet a further mode of position-keeping is enabled by remote adjustment of the camber of the hydrofoil element or elements of one or more paravanes. Thus, not only can hydrofoil angle of attack be varied, but the amount of lateral thrust can also be varied for position-keeping. It is contemplated that automatic control be utilized whereby course or rapid cable positioning can be effected by altering hydrofoil angle of attack, and desired position can then be kept by adjusting the direction and amount of camber of the hydrofoil elements on one or more paravanes.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A paravane apparatus for controlling depth and lateral positioning of a marine seismic cable, comprising:

elongated frame means including a stabilizer element at one end thereof;

means resiliently attaching said paravane to said marine seismic cable to support said cable at a preselected depth; at least one hydrofoil means rotatably attached to and extending vertically from said frame means at the other end thereof; and means controllable to vary the camber and direction of camber of said hydrofoil means including:
- a first motor and gear linkage actuatable to rotate said hydrofoil means;
- a second motor and gear linkage actuatable to vary said camber and direction of camber of said hydrofoil means; and
- electronic circuit means for selectively engaging said first and second motors to effect lateral positioning of the seismic cable.

2. Apparatus as set forth in claim 1 wherein said electronic circuit means is a remotely controllable transmission and reception device.

3. In a paravane which includes controllable elements for maintaining lateral positioning of a marine seismic cable, said paravane having a frame portion resiliently supporting said cable in water with at least one hydrofoil extending from said frame means, an improved hydrofoil comprising:
- frame means rigidly defining the peripheral shape of said hydrofoil means;
- resilient skin material completely covering said frame means;
- a plurality of rigid plates bonded to the inside of said resilient skin means on each side of the hydrofoil means which are independently movable relative to said frame means; and
- a screw jack assembly affixed between opposite side plates and being movably affixed relative to said frame means such that said screw jack assembly functions to vary the camber and direction of camber of said hydrofoil.

4. An improved hydrofoil as set forth in claim 3 wherein said frame means comprises:
- a longitudinal base frame affixed to an arcuate forward support frame defining the leading-edge circle which, in turn, is secured to an arcuate rib frame that is secured to a trailing edge frame member as affixed to the remaining end of said longitudinal base frame thereby to define said peripheral shape.

5. An improved hydrofoil as set forth in claim 3 which is further characterized to include:
- electrical motor means supported by said frame means and energizable to actuate said screw jack assembly thereby to enable selective variation of said hydrofoil camber.

* * * * *